United States Patent
Bordawekar et al.

(10) Patent No.: US 8,464,026 B2
(45) Date of Patent: Jun. 11, 2013

(54) METHOD AND APPARATUS FOR COMPUTING MASSIVE SPATIO-TEMPORAL CORRELATIONS USING A HYBRID CPU-GPU APPROACH

(75) Inventors: Rajesh Ramkrishna Bordawekar, Hawthorne, NY (US); Ravishankar Rao, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 12/707,198

(22) Filed: Feb. 17, 2010

(65) Prior Publication Data

US 2011/0202745 A1    Aug. 18, 2011

(51) Int. Cl.
*G06F 15/76* (2006.01)
(52) U.S. Cl.
USPC .................................. 712/30; 712/7
(58) Field of Classification Search
USPC ........................ 712/7, 30, 221, 222
See application file for complete search history.

(56) References Cited

U.S. PATENT DOCUMENTS

| | | | | |
|---|---|---|---|---|
| 5,335,195 A | * | 8/1994 | Jutand et al. | 708/520 |
| 5,751,616 A | * | 5/1998 | Hegland et al. | 708/401 |
| 5,852,734 A | * | 12/1998 | Komatsu et al. | 717/156 |

* cited by examiner

*Primary Examiner* — Aimee Li
(74) *Attorney, Agent, or Firm* — Scully, Scott, Murphy & Presser, P.C.; Louis J. Percello, Esq.

(57) ABSTRACT

A CPU may select a variable from a variable set as a dependent variable. The variable set may be part of the data structure that includes a plurality of vector values, a vector value associated with a variable set of n number of variables, and each variable of the variable set having a variable value. The number of dependent variable steps for the dependent variable may be determined. The number of the vector values in a dependent variable step is determined as being number of independent variables. A function is mapped to a plurality of thread processors, and each thread processor is assigned for the function to be performed on each one of the independent variables for each of the dependent variable steps.

17 Claims, 6 Drawing Sheets

| V | X1 | X2 | X3 | | Xn |
|---|----|----|----|---|----|
| 5 | 0  | 0  | 0  |   | 0  |
| 7 | 1  | 0  |    |   | 0  |
|   |    |    |    |   |    |
|   |    |    |    |   |    |
|   |    |    |    |   |    |
|   |    |    |    |   |    |
|   |    |    |    |   |    |

Fig. 4

METHOD AND APPARATUS FOR COMPUTING MASSIVE SPATIO-TEMPORAL CORRELATIONS USING A HYBRID CPU-GPU APPROACH

FIELD

The present disclosure generally relates to computer processors and graphical processors, and more particularly to computing massive spatio-temporal correlations using a hybrid central processing unit and graphical processing unit approach.

BACKGROUND

A graphics processing unit or GPU is a specialized processor that performs graphics renderings and mathematical computations needed for the renderings. The increasing spatial and temporal resolution of data obtained in fields like medical imaging generates computational bottleneck. Such large amounts of data need to be processed and analyzed efficiently. While using clusters or super-computers that provide parallel processing may address some of the needs, they may involve high cost and data center to house the physical size of such clusters.

In the world of medical imaging as an example, processing needs are co-located with the imaging devices. This may be partly due to privacy and data integrity concerns, for instance, where sensitive patient data is not usually sent over networks. Bandwidth restrictions of the networks also preclude transmitting a large dataset over networks.

BRIEF SUMMARY

A computer system and method for computing massive spatio-temporal correlations are provided. The system, in one aspect, may include one or more memories, and one or more data structures stored on one or more of the memories. The data structures may include a plurality of vector values, a vector value associated with a variable set of n number of variables, and each variable of the variable set has a variable value. One or more calculating units may be operable to perform arithmetic and logical operations on the one or more data structures. A splitting processor may be operable to select one of the variables in the variable set as a dependent variable. The splitting processor further may be operable to determine a number of dependent variable steps for the dependent variable. The splitting processor also may be operable to determine a number of the vector values in a dependent variable step as being the number of independent variables, the dependent variable step being a dimension of the variable set having the same value for the dependent variable. The splitting processor further may be operable to map a function to a plurality of thread processors, wherein number of the thread processors is determined by multiplying the number of dependent variable steps and the number of independent variables. The splitting processor yet further may be operable to assign one thread processor for the function performed on each one of the independent variables for each of the dependent variable steps, the thread processors accessing the one or more calculating units to perform the function.

A method for computing massive spatiotemporal correlations, in one aspect, may include selecting a variable from a variable set as a dependent variable. The variable set in one or more data structures may be stored on one or more of the memories, the data structures including a plurality of vector values. A vector value is associated with a variable set of n number of variables, and each variable of the variable set has a variable value. The method may also include determining the number of dependent variable steps for the dependent variable, the dependent variable step being a dimension of the variable set having the same value for the dependent variable. The method further may include determining number of the vector values in a dependent variable step as being number of independent variables. The method may also include mapping a function to a plurality of thread processors, wherein number of the thread processors is determined by multiplying the number of dependent variable steps and the number of independent variables. The method may also include assigning one thread processor for the function performed on each one of the independent variables for each of the dependent variable steps. The method further may include each of the thread processors performing the respectively assigned function.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 4 illustrates an example of the evaluator process.

DETAILED DESCRIPTION

A combined CPU-GPU (Central Processing Unit—Graphical Processing Unit) approach may be used to process large set of data and computation. In one embodiment, the dataset may be partitioned appropriately in order to deploy a single-instruction multiple-data programming model on the GPU. In the Single-Instruction Multiple Data (SMID) model, multiple processing threads execute the same instruction in a lock-step manner. Typical GPU usage (e.g., image display, texture mapping) does not incorporate significant CPU computations. In this disclosure, the computations performed by the CPU and the GPU may be balanced.

In one aspect, a multi-core CPU may be used as a host processor and a PCI-e (Peripheral Component Interconnect Express) connected GPU as the accelerator. The CPU may perform the book-keeping and carry out image management tasks (e.g., reading/writing image files). The computationally intensive portion of the work may be then executed on the GPU. The CPU may read the input file, preprocess the data and invoke a kernel on the GPU. The GPU kernel invocation may first copy the data from the CPU's host memory to the GPU device memory. The GPU may execute the specific code for computations such as the correlation between two data sequences stored in the device memory. The GPU algorithm may use a massively multi-threaded (the number of threads usually match the number of columns in the image data set) algorithm to process the image. After the computation, the GPU may copy back the results.

In another aspect, the combined CPU-GPU approach may be used to analyze the networks such as gene regulatory networks and brain networks obtained through an analysis of fMRI (functional magnetic resonance imaging) data. The networks are typically represented as graphs, which can be very large (e.g., thousands of nodes and edges), and may be structured into different motifs or templates such as a collection of node triplets, bi-fan structure, cycles of varying length, and/or others. The combined CPU-GPU approach of the present disclosure may analyze the distribution of such motifs or templates.

A large number of threads on the GPU may perform exhaustive analysis of graph motifs such as cycles in a directed graph. A cycle refers to a closed path in a directed graph where a sequence of edges starts and ends in the same node. A cycle may include different path lengths. Pre-processing to convert the graph data into a form that can be efficiently processed by the GPU threads may be performed by first converting the graph to an intermediate form as discussed below, which then may be traversed in parallel by a large number of GPU threads. In one aspect, one or more of the algorithms utilized in the present disclosure may be iterative.

Figure 6:
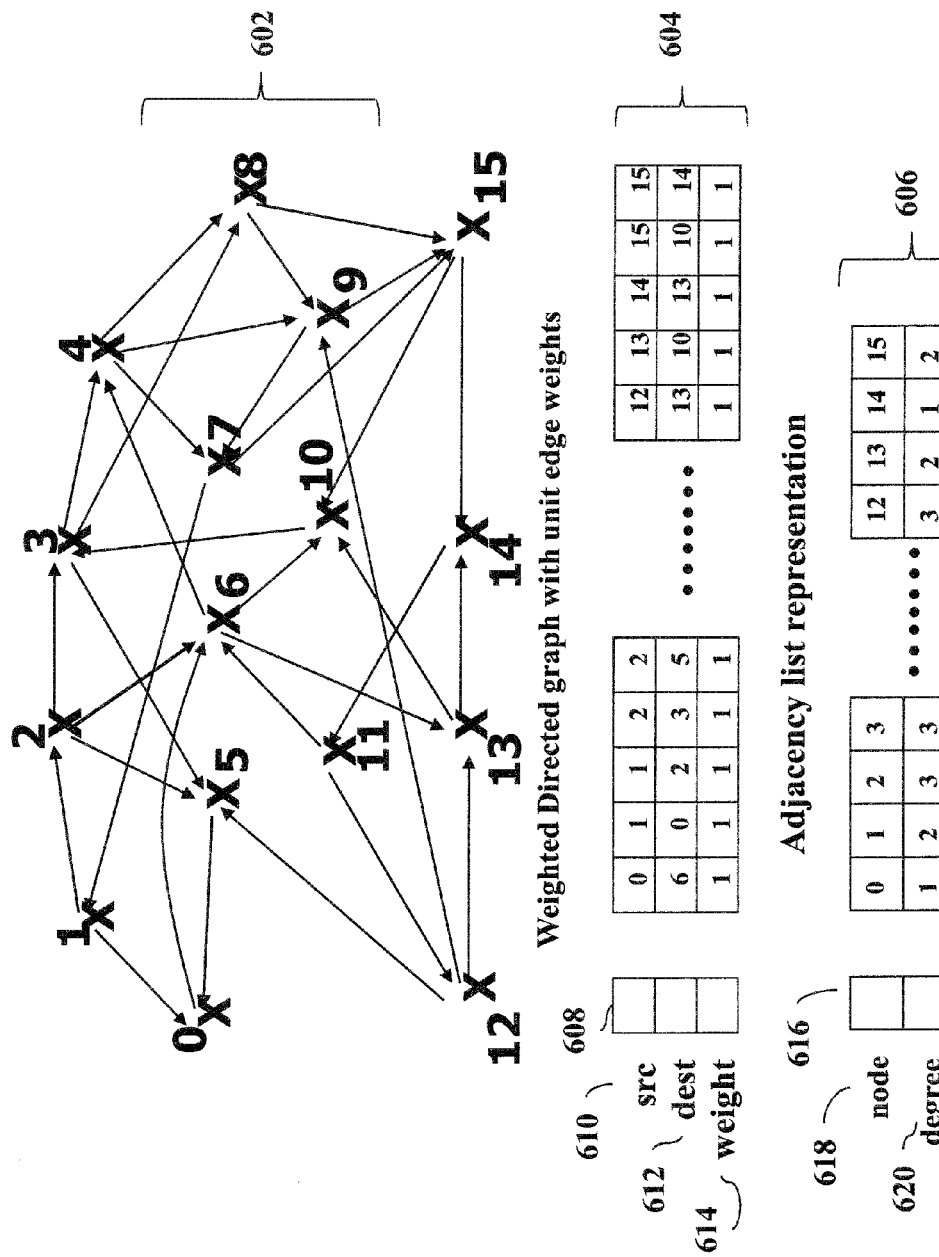
FIG. 6 illustrates an example of a graph structure converted into a list structure according to one embodiment of the present disclosure.

In the hybrid (or combined) CPU-GPU, the CPU may read the input graph and store it, for instance, in adjacency list based data structures. An example of this data structure is shown in FIG. 6. A directed graph 602, for example, having unit edge weights may be converted into one or more data structure representations as shown at 604 and 606. Other data structure representations are possible. In the example shown at FIG. 6, each entry 608 in the adjacency list 604 includes the start 610 and end nodes 612 of an edge, and its associated weight 614. The algorithm may also use additional list 606 that stores the degree of individual nodes. Each entry 616 in this list 606 may include a node 618 and its outgoing degree 620, that is, to how many other nodes it links directly.

The CPU may also reorganize the graph so as to improve the data access locality in the GPU kernel processing via reordering the adjacency list according to the degree of nodes. For reorganizing, the CPU may take as input the GPU thread mapping information, which includes the total number of threads and the thread organization (e.g., one or two-dimensional mapping). The GPU may read the graph data using such two arrays and assign each graph edge to a participating thread. The two arrays correspond to the adjacency 604 and node list 606 data structures. The total number of threads used matches the number of edges in the graph. Each thread is assigned a logical number and it gets mapped to the corresponding edge in the graph. Each thread may navigate the graph using the assigned edge by traversing an edge, adding the children to a shared work queue and then fetching more work from the shared work queue (a work stealing algorithm). The algorithm may use a hierarchical multi-level work queue to store and process available work. In one aspect, the work queue is shared only by threads in the thread block, which improves the overall performance. The thread block is a logical cluster of processing threads arranged in a one or two-dimensional grid. The thread block can be defined by the GPU-specific programming languages such as NVIDIA™'s Compute Unified Device Architecture (CUDA), or Open Computing Language (OpenCL).

In another aspect, linear matrix algebra solutions (e.g., sparse matrix multiplication) may be used to find motifs.

Figure 1:
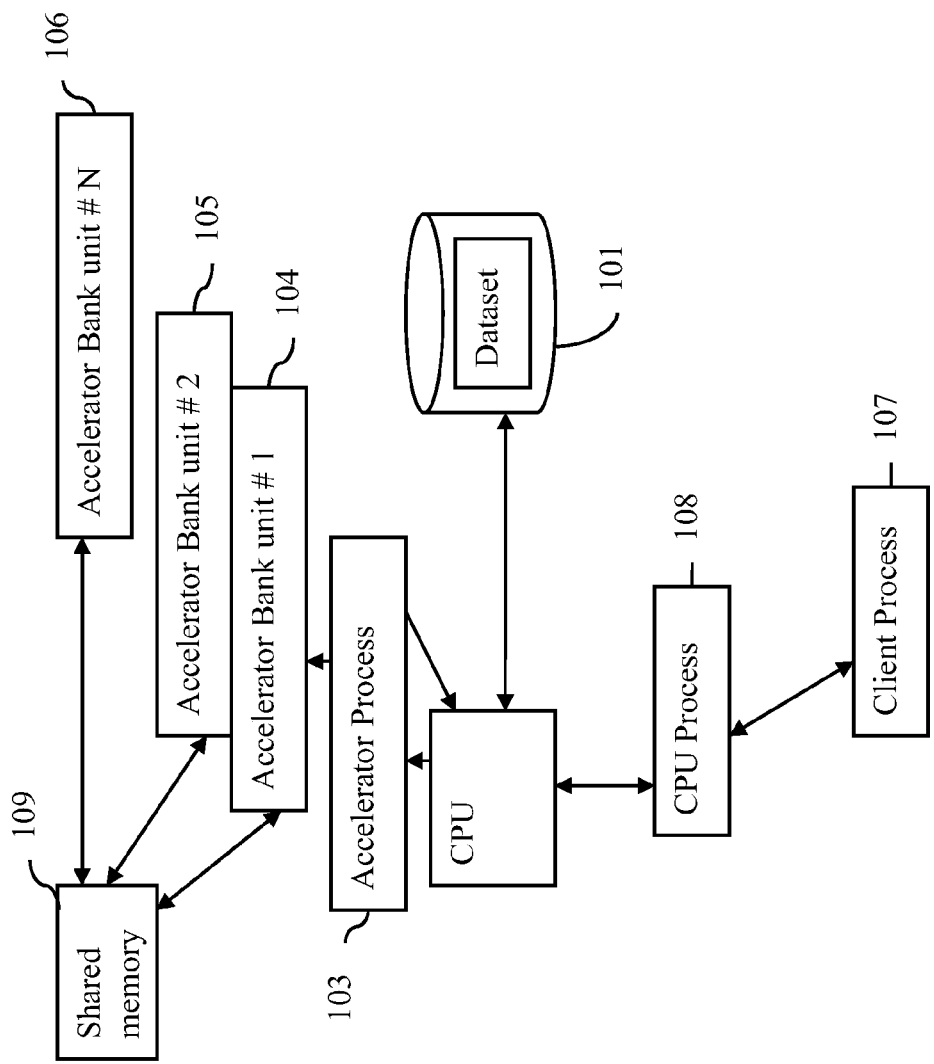
FIG. 1 is an architectural diagram illustrating functional components for the combined CPU-GPU in one embodiment of the present disclosure.

FIG. 1 is an architectural diagram illustrating functional components for the combined CPU-GPU in one embodiment of the present disclosure. In FIG. 1, a Client Process 107 communicates a desired computation to the CPU process 108. This could be in the form of a programming language, e.g., C or others. The CPU process 108 performs a computation on the data resident in a dataset 101. The CPU process 108 re-orders the dataset into subsets, and communicates these subsets to an accelerator process 103. The accelerator process 103 sends each individual subset to one or more accelerator bank units, for example, shown at 104, 105 and 106. There may be a plurality of or multiple such accelerator bank units. The accelerator process 103 receives the results of the computations of the accelerator bank units, e.g., 104, 105, 106, and communicates them to the CPU process 108. The CPU process 108 may perform a final aggregation of these results, and transmit the final result to the Client process 107.

Figure 2:
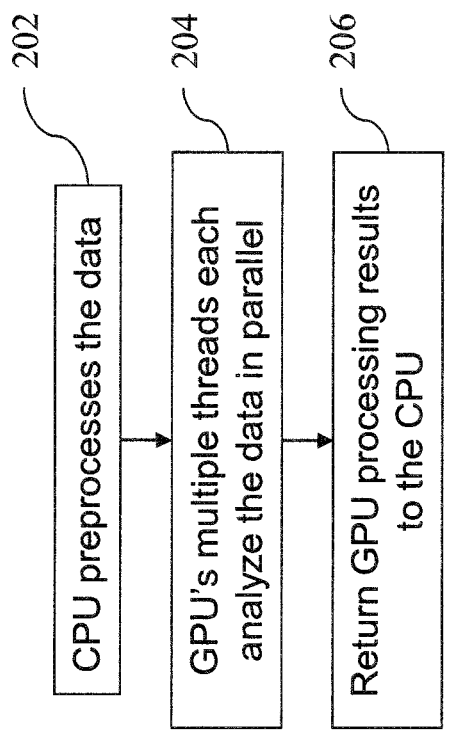
FIG. 2 is a flow diagram illustrating a method for hybrid CPU-GPU processing data in one embodiment of the present disclosure.

FIG. 2 is a flow diagram illustrating a method for hybrid CPU-GPU processing of data in one embodiment of the present disclosure. At 202, CPU preprocesses the data into a format that the GPU can access and process. Preprocessing may include partitioning graph data and putting the data into a different data structure, e.g., an adjacency list, not necessarily in that order. Preprocessing may also include reorganizing the data according to the GPU thread mapping information. At 204, GPU's multiple threads each analyze the data in parallel. Each thread may have different edges of the graph data assigned to it for processing. At 206, the results of the GPU processing are returned to the CPU, for example, written to the memory local to the CPU for the CPU to access.

Figure 3:
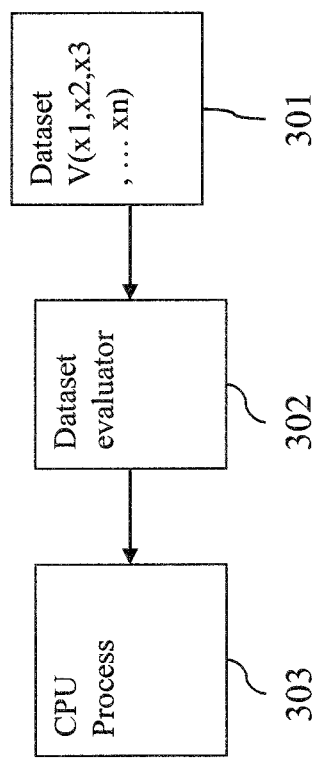
FIG. 3 illustrates example computation performed by the CPU in more detail.

FIG. 3 illustrates example computation performed by the CPU in more detail. Generally, the CPU decomposes the data in the dataset appropriately to facilitate computation by the accelerator bank units. FIG. 3 shows the function of a dataset evaluator. The dataset evaluator determines whether the dataset is in the form of a n-tuple, V(x1, x2, x3, . . . , xn). This n-tuple serves to model specific situation such as the relationship between independent variable V and dependent variables x1, x2, x3, . . . , xn. At 301, the data is shown in the form of an n-tuple, such that the value V at a point in n-dimensional space is a function of the coordinates (x1, x2, x3, . . . xn). For example, V could be the image intensity value of brain activity measured at spatial coordinates (x1, x2, x3) in a 3-dimensional space. Here the value V is dependent on the coordinates (x1, x2, x3). The dataset evaluator 302 examines the input data and verifies that all the coordinates have been specified, and that each coordinate contains a unique value, V. This step ensures that there are no missing values in the sequence x1, x2, . . . , xn for a given point. Furthermore, the problem is ill-specified if there are multiple values V for a single n-tuple x1, x2, . . . , xn. Such a situation indicates an input data error and is flagged as such. Upon satisfactory evaluation, the data is passed on to the CPU process 303.

Figure 4:
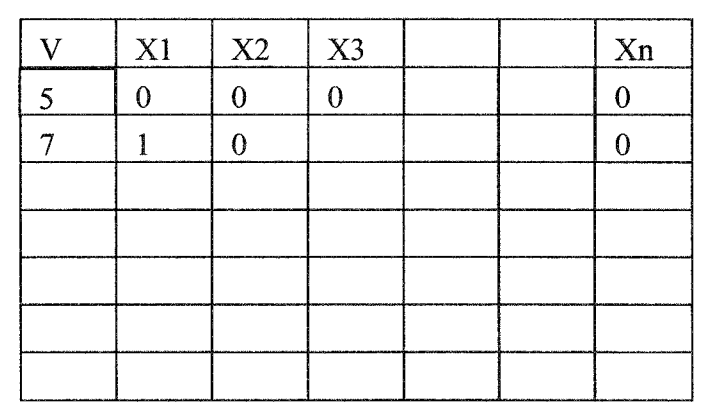

FIG. 4 illustrates an example of the evaluator process shown in FIG. 3. The value V at coordinate (0, 0, . . . , 0) is 5. The value V at coordinate (1, 0, . . . 0) is 7. The data lies on a multidimensional grid with n dimensions. Each dimension gives rise to a coordinate along that dimension. The coordinate axes are represented by x1, x2, x3, . . . xn. At each grid point there is a value, e.g., V. For instance, at the coordinate point (0, 0, . . . , 0), the value is V=5. At the coordinate point (1, 0, 0, . . . , 0), the value is V=7. The data evaluator checks to ensure that the input data is of this format in this example. This is a flexible format and can accommodate data from a variety of sources, including multidimensional images, seismic data, geographical data, financial data. This can also be used to capture data from dynamical time-varying systems, where one of the coordinates could represent time.

The CPU employs one or more decision logic to determine how the data V(x1, x2, . . . xn) is processed by the individual units in the accelerator banks, for example, 104, 105, 106 shown in FIG. 1. In this sense, the CPU can be considered to be the splitting processor as it splits or partitions the work into multiple computable units. The CPU can direct the accelerator process to perform any computable function.

Figure 5:
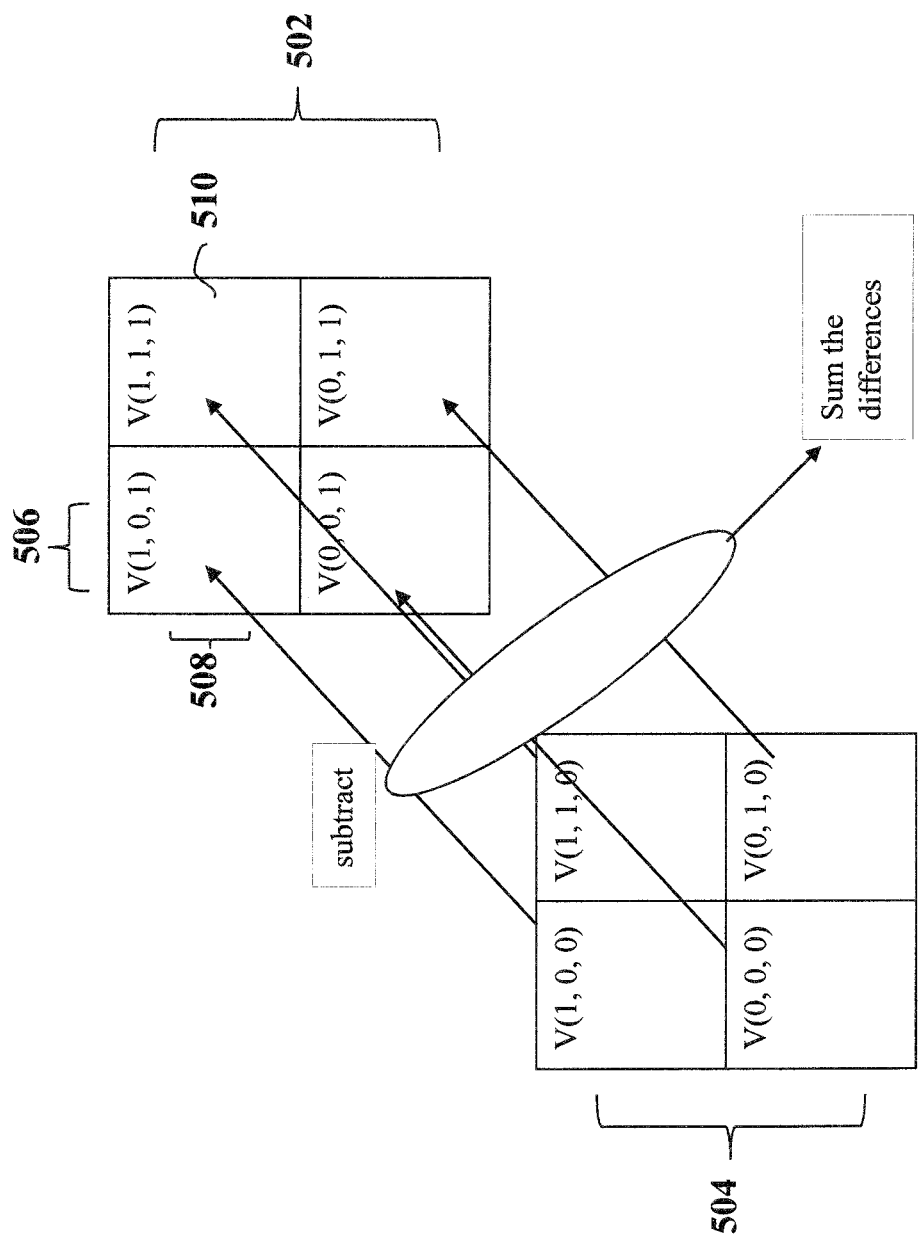
FIG. 5 illustrates a computation an example of data subdivision and processing.

A splitting processor may select of one of the variables in the variable set (e.g., coordinates) as a dependent variable, determine the number of dependent variable steps for the dependent variable and determine the number of the vector values in one dependent variable step as being the number of independent variables. The splitting processor further may map a function to a plurality of thread processors, wherein number of the thread processors is determined by multiplying the number of dependent variable steps and the number of independent variables. The splitting processor may assign one thread processor for the function performed on each one of the independent variables for each of the dependent variable steps, the thread processors accessing the one or more calculating units to perform the function. FIG. 5 illustrates an example of this.

FIG. 5 illustrates a computable function for differencing of successive values of V. As an example, consider the values V to be defined on a two dimensional (2D) grid, with coordinates (x1, x2), and indexed by time, such that x3=t. Hence, V(x1, x2, t) may represent the value at a certain instant in time at the point (x1, x2). Let x1 be defined in the discrete range [0 . . . 1] and x2 be defined in the range [0.1 . . . ]. Thus, x1 and x2 describe a square whose height and width are 2 units. For the sake of convenience, a frame at time t is denoted by the set of values V where x3=t. This constitutes a 2D image at time t. The operation to carry out may be the differencing of successive frames, i.e., V(x1, x2, 1)−V(x1, x2, 0) and summing the differences over all values of x1 and x2.

The CPU partitions the data V into slices, 502 and 504 for example, for individual values of t and stores successive frames in the shared memory (e.g., FIG. 1, 109). A thread block defined earlier can be also referred to as an accelerator bank due to the functionality of computational acceleration provided by the thread block. For example, accelerator bank unit 0 may compute the sum of the differences over frames 0 and 1, accelerator unit 1 may compute the sum of the differences over frames 1 and 2, and so on.

Each accelerator bank unit can then use a set of threads to process every assigned frames in parallel. Depending on the layout of the image frame, the accelerator chooses a thread mapping to achieve maximum concurrency. For example, for a 2D image frame, each thread can be assigned to a data variable, thus forming a logical 2D thread map. For instance, in frame at 502, four threads may each operate a different data variable (e.g., 510). Alternatively, a thread can process either of row 508 or column 506 of data variables using a one-dimensional thread map. This is an example of an application wherein the method and/or system of the present disclosure tries to detect differences between two images. The method and/or system of the present disclosure may perform a pairwise subtraction between two successive images and sum the differences over a small neighborhood. In FIG. 5, a 3-tuple is used such that x1 represents time, x2 and x3 represent two-dimensional spatial coordinates. Hence V(1, 0, 0) is the value for t=1 at the origin. Each thread operates on a pair of tuples that share a dimension (e.g., V(1,0,0) and V(1,0, 1)). Each thread can access an arithmetic and logical unit which performs each operation. This unit is referred as a calculating unit. An acceleration bank includes multiple calculating units.

In the above example, the independent variable is V, variable set includes variables or coordinates x1, x2, t. In this example, the CPU selects t is as the dependent variable. The number of dependent variable steps is the number of different values of t, i.e., the number of frames. The number of independent variable V is the number of different values of V in one frames, i.e., in a set having the same value of t. Each thread or thread processor performs a difference function between a V of one frame and V of another frame that shares a dimension (another variable in the variable set). The total number of threads or thread processors is the product of the number of independent variables and the number of dependent variable steps, in the above example, the number of frames at different times t.

In one aspect, the thread processors may be divided into at least two thread banks, each of the thread banks capable of performing a bank specific function. The first thread bank may be assigned with a first set of independent variables and a first set of dependent variable steps. The second thread bank may be assigned with a second set of independent variables and a second set of dependent variable steps. The assignment to the respective thread banks may be determined by a target function. Yet in another aspect, the division between the first thread bank and the second thread bank may change dynamically.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perfoim the specified functions or acts, or combinations of special purpose hardware and computer instructions.

A computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer system for computing massive spatio-temporal correlations, comprising:
   one or more memories;
   one or more data structures stored on one or more of the memories, the data structures including a plurality of vector values, a vector value associated with a variable set of n number of variables, and each variable of the variable set having a variable value;
   one or more calculating units operable to perform arithmetic and logical operations on the one or more data structures;
   a splitting processor operable to select one of the variables in the variable set as a dependent variable, the splitting processor further operable to determine a number of dependent variable steps for the dependent variable, the splitting processor further operable to determine a number of the plurality of vector values in a dependent variable step as being a number of independent variables, the dependent variable step being a dimension of the variable set having a same value for the dependent variable,
   the splitting processor further operable to map a function to a plurality of thread processors, wherein a number of the plurality of thread processors is determined by multiplying the number of dependent variable steps and the number of independent variables,
   the splitting processor further operable to assign one thread processor for the function performed on each independent variable for each of the dependent variable steps, the thread processors accessing the one or more calculating units to perform the function.

2. The system of claim 1, wherein the plurality of thread processors is divided into at least two thread banks, each of the thread banks capable of performing a bank specific function.

3. The system of claim 2, wherein the splitting processor is further operable to assign a first thread bank with a first set of independent variables and a first set of dependent variable steps and to assign a second thread bank with a second set of independent variables and a second set of dependent variable steps.

4. The system of claim 3, wherein assignment to respective thread banks is determined by a target function.

5. The system of claim 2, wherein division between a first thread bank and a second thread bank changes dynamically.

6. A method for computing massive spatio-temporal correlations, comprising:
   selecting a variable from a variable set as a dependent variable, the variable set in one or more data structures stored on one or more of the memories, the data structures including a plurality of vector values, a vector value associated with a variable set of n number of variables, and each variable of the variable set having a variable value;
   determining a number of dependent variable steps for the dependent variable, a dependent variable step being a dimension of the variable set having a same value for the dependent variable;
   determining a number of the plurality of vector values in a dependent variable step as being a number of independent variables;
   mapping a function to a plurality of thread processors, wherein a number of the thread processors is determined by multiplying the number of dependent variable steps and the number of independent variables;
   assigning one thread processor for the function performed on independent variable for each of the dependent variable steps; and
   each of the thread processors performing the respectively assigned function.

7. The method of claim 6, wherein the plurality of thread processors is divided into at least two thread banks, each of the thread banks capable of performing a bank specific function.

8. The method of claim 7, wherein the method further assigns a first thread bank with a first set of independent variables and a first set of dependent variable steps and to assign a second thread bank with a second set of independent variables and a second set of dependent variable steps.

9. The method of claim 8, wherein assignment to respective thread banks is determined by a target function.

10. The method of claim 9, wherein division between the first thread bank and the second thread bank changes dynamically.

11. The method of claim 6, further including:
    aggregating results of the plurality of thread processors; and
    returning the aggregated result.

12. A computer readable storage medium storing a program of instructions executable by a machine to perform a method of computing massive spatio-temporal correlations, comprising:
    selecting a variable from a variable set as a dependent variable, the variable set in one or more data structures stored on one or more of the memories, the data structures including a plurality of vector values, a vector value associated with a variable set of n number of variables, and each variable of the variable set having a variable value;
    determining number of dependent variable steps for the dependent variable, a dependent variable step being a dimension of the variable set having a same value for the dependent variable;
    determining a number of the plurality of vector values in a dependent variable step as being number of independent variables;
    mapping a function to a plurality of thread processors, wherein number of the thread processors is determined by multiplying the number of dependent variable steps and the number of independent variables;

assigning one thread processor for the function performed on each independent variable for each of the dependent variable steps; and each of the plurality of thread processors performing a respectively assigned function.

13. The computer readable storage of claim 12, wherein the plurality of thread processors is divided into at least two thread banks, each of the thread banks capable of performing a bank specific function.

14. The computer readable storage of claim 13, wherein the method further assigns a first thread bank with a first set of independent variables and a first set of dependent variable steps and to assign a second thread bank with a second set of independent variables and a second set of dependent variable steps.

15. The computer readable storage of claim 14, wherein assignment to respective thread banks is determined by a target function.

16. The computer readable storage of claim 15, wherein division between the first thread bank and the second thread bank changes dynamically.

17. The computer readable storage of claim 12, further including:

aggregating results of the plurality of thread processors; and returning the aggregated result.

* * * * *